United States Patent Office 3,370,060
Patented Feb. 20, 1968

3,370,060
ENAMINOKETONES
Gerhard H. Alt, Creve Coeur, and Angelo J. Speziale, Kirkwood, Mo., assignors to Monsanto Company, a corporation of Delaware
No Drawing. Filed Aug. 22, 1962, Ser. No. 218,548
6 Claims. (Cl. 260—247.7)

This invention relates to a new family of chemical compounds and a novel procedure for preparing them. More specifically, the invention relates to compounds having antioxidant and useful biological properties, especially as bacteristats.

In accordance with this invention, enaminoketones are reacted with acid halides of certain types of carboxylic acids. To be useful in the preparation of the new compounds, the acid chlorides and acid bromides of carboxylic acids having an aqueous solution low hydrogen ion concentrations, for example a pKa greater than 1.3 and preferably greater than 2.0. Acid anhydrides as well as the acid halides can be used in this reaction, which takes place in accordance with the following equation:

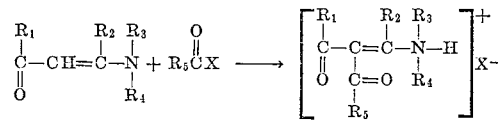

wherein $R_1$ and $R_2$ are selected from the group consisting of alkyl radicals of up to four carbon atoms and the radicals such that $R_1$ and $R_2$ together are selected from the group consisting of alkylene radicals and radicals of two to ten carbon atoms forming a closed ring of 4 to 8 carbon atoms and where $R_3$ and $R_4$ are radicals selected from the group consisting of alkyl radicals of up to four carbon atoms and radicals such that the $R_3$ and $R_4$ together is a divalent radical having from 2 to 7 carbon atoms selected from the group consisting of alkylene radicals, oxaalkylene radicals and thiaalkylene radicals; and wherein $R_5$ is the organic moiety attached to the carbonyl of a carboxylic acid having a pKa value greater than 1.3.

A preferred class of these enaminoketones are those of the structure:

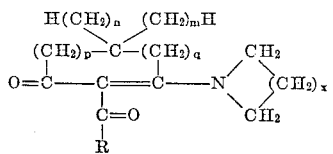

wherein $p$, $q$, $m$ and $n$ are integers from zero to two, and wherein $x$ is an integer from zero to five.

The corresponding morpholine derivatives are also preferred.

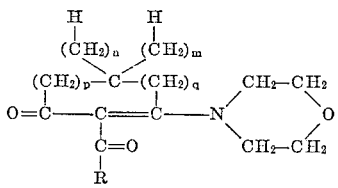

In the above description of the reactants the said organic moiety of the carboxylic acid ($R_5$) is preferably a radical selected from the class consisting of hydrocarbons of the class consisting of alkyl or up to ten carbon atoms, phenyl, naphthyl and cycloalkyl radicals of from 4 to 7 carbon atoms; and the said hydrocarbon radicals containing substituents of the group consisting of chlorine, bromine, fluorine, alkoxy radicals having up to 4 carbon atoms, alkyl radicals of up to 4 carbon atoms, phenyl, halophenoxy and nitro.

The reactions are effected by mixing the enaminoketone and the acid anhydride or the said acid chloride or bromide with a suitable inert organic solvent. Suitable solvent are the hydrocarbons such as carbon tetrachloride, benzene, toluene, ethylene dichloride and xylene. The mixture so prepared may be heated at reflux temperature to induce the reaction. If an acid anhydride is used, the reaction may be conducted in solutions in the excess of reactant charged, and after evaporation of the excess acid anhydride the residue of desired product may be taken up in a small quantity of solvent such as benzene from which the product may be readily separated.

Suitable carboxylic acids, halides and anhydrides for the practice of this invention include the halides and anhydrides which are relatively weak having low ionization constants and pKa values greater than 1.3 and preferably greater than two. These useful acids include:

Acetic acid; chloroacetic acid; benzoic acid; 4-chlorobenzoic acid; 3,4-dichlorobenzoic acid; β,β-dichlorobutyric acid; octoic acid; 2-methyl-4-chlorobenzoic acid; α-phenylacetic acid; propionic acid; butyric acid; 2,4-dinitrobenzoic acid; α-bromopropionic acid; isobutyric acid; hexoic acid; 2,4,6-trichlorobenzoic acid; β,β-dibromopropionic acid; 2,4,5-trichlorobenzoic acid; 2,6-dichlorobenzoic acid; 4-bromobenzoic acid; 2-methoxybenzoic acid; phenoxyacetic acid; 2,4-dichlorophenoxyactic acid.

The free bases formed in the novel process are frequently hygroscopic and are difficult to refine in their normal state. The amine salts are frequently less hygroscopic and provide salts which can be readily separated from the organic solvent reaction medium. The perchloric acid salt is especially useful for this purpose. The amine salts can be converted back to the free base by reaction with an alkaline metal hydroxide.

Further details in the practice of this invention are set forth in the following specific examples.

Example 1

A solution of 4.9 grams of an eniminoketone of the structure

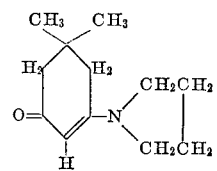

in 70 ml. of benzene was mixed with 2 grams of acetyl chloride in 20 ml. of benzene and heated at reflux temperature for three hours. The reaction mixture was then filtered and the filtrate was then evaporated to dryness. The residue was recrystallized fom an ethyl acetate-hexane mixture and identified as 2-acetyl-5,5-dimethyl-3N-pyrrolidylcyclohex-2-en-1-one (M.P. 158–159).

Example 2

The procedure of Example 1 was repeated except that a large excess of acetic anhydride was used in place of the acetyl chloride and benzene. A small amount of sodium acetate was included. The reaction mixture was distilled in vacuo to remove unreacted acetic anhydride. The product (M.P. 157–159) was identified as being identical to the product of Example 1.

Example 3

The procedure of Example 1 was repeated except that acetyl bromide was used in place of acetyl chloride. The product was again identified as being the same as the product of Example 1.

Example 4

The procedure of Example 1 was repeated except that 3,4-dichlorobenzoyl chloride was used in place of acetyl chloride. The benzene reaction medium was evaporated and the residue was recrystallized from aqueous ethanol. The product was identified by infrared spectrum analysis and confirmed by elemental analysis to be 2,3,4-dichlorobenzoyl-5,5-dimethyl-3N-pyrrolidylcyclohex-2-en-1-one.

Examples 5 to 16

By varying the eniminoketone and the carboxylic acid chloride or anhydride the following different compounds are prepared:

2-acetyl-3N-piperidylcyclohex-2-en-1-one
2-cyclohexoyl-3N-morpholylcyclohex-2-en-1-one
2-acetyl-5,5-dimethyl-3N-piperidylcyclohex-2-en-1-one
3',4'-dichlorobenzoyl-5,5-dimethyl-3N-pyrrolidyl-cyclohex-2-en-1-one
2-acetyl-5,5-dimethyl-3N-morpholylcyclohex-2-en-1-one
2-benzoyl-5,5-dimethyl-3N-pyrrolidylcyclohex-2-en-1-one
2',4',6'-trinitrobenzoyl-3N-pyrrolidylcyclopent-2-en-1-one
2-acetyl-5,5-dimethyl-3N-(diisopropylamine)cyclohex-2-en-1-one
4-propionyl-5N-morpholylhept-4-en-3-one
5-benzoyl-5N-diethylaminohept-5-en-4-one
2',4',5'-benzoyl-2N-dimethylaminopent-3-en-2-one
5-isobutoyl-6N-pyrrolidylnon-5-en-4-one Although the invention is described with respect to specific modifications it is not intended that the details thereof shall be limitations on the scope of the invention except to the extent incorporated in the following claims.

What is claimed is:
1. A compound of the structure

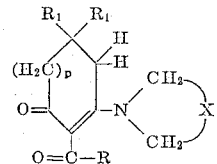

wherein X is selected from the class consisting of $-CH_2CH_2-$, $-CH_2OCH_2-$ and $-CH_2CH_2CH_2-$ wherein $R_1$ is selected from the class consisting of hydrogen and lower alkyl; wherein R is selected from the class consisting of lower alkyl, phenyl and phenyl substituted with halogen or nitro; and wherein $p$ is an integer from zero to two.

2. 2-acetyl-3N-piperidylcyclohex-2-en-1-one.
3. 2-cyclohexoyl-3N-morpholylcyclohex-2-en-1-one.
4. 2-acetyl-5,5-dimethyl - 3N-piperidylcyclohex-2-en-1-one.
5. 2-acetyl - 5,5-dimethyl-3N-morpholylcyclohex-2-en-1-one.
6. 2-benzoyl - 5,5-dimethyl-3N-pyrrolidylcyclohex-2-en-1-one.

References Cited

Leonard et al.: Jour. Am. Chem. Soc., vol. 81, pp. 595–602 (1959).

NORMA S. MILESTONE, *Acting Primary Examiner.*

N. S. RIZZO, *Examiner.*

A. D. SPEVACK, R. PRICE, *Assistant Examiners.*